Patented June 30, 1942

2,288,178

UNITED STATES PATENT OFFICE 2,288,178

PROCESS OF PREPARING ACYLATED HALOGEN ALKYL AMINES

Herbert Bestian, Frankfort-on-the-Main-Unterliederbach, Germany, assignor, by mesne assignments, to General Aniline & Film Corporation, New York, N. Y., a corporation of Delaware No Drawing. Application July 3, 1939, Serial No. 282,692. In Germany July 12, 1938

5 Claims. (Cl. 260—404)

The present invention relates to the manufacture of acylated halogen-alkylamines and to the products obtained.

In "Berichte der Deutschen Chemischen Gesellschaft," vol. 28, page 2933 and vol. 32, page 2037, there is described the action of benzoyl chloride and benzene-sulphochloride on ethylene-imine in the presence of an agent having an alkaline action, the products being N-benzoyl- and N-benzene-sulphonyl-ethylene-imine, respectively.

I have found that cleavage of the ring occurs, if a monomeric $\alpha,\beta$-alkylene-imine is added in at most equimolecular proportion and in the absence of an agent having an alkaline action to a carboxylic or sulfonic acid halide. N-acylated $\beta$-halogen-ethylamines are obtained in a smooth reaction from ethylene imine as follows:

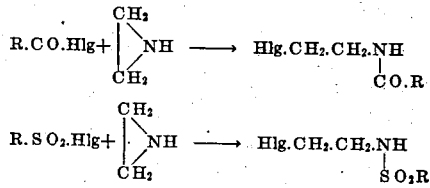

wherein R means an organic radical and Hlg means halogen.

The reaction, which may advantageously be carried out in an indifferent organic solvent or diluent, occurs in the cold and is exothermic. In some cases it is necessary in order to obtain a good yield to maintain the temperature of the reaction below 0° C.

Instead of the ethylene-imine there may also be used the homologous $\alpha$-$\beta$-alkylene-imine as, for instance, propylene-imine, butylene-imine and the higher homologues. In the same manner the $\alpha$-$\beta$-alkylene-imines which are substituted at the nitrogen atom may be used.

Beside the aliphatic, cyclo-aliphatic, aromatic and araliphatic carboxylic acid halides and sulphonic acid halides there may also be caused to react with $\alpha$-$\beta$-alkylene-imines in a smooth manner phosgene, the carbamic acid halides and halogen-carbonic acid esters which are likewise to be considered as carboxylic acid halides. In this way there are obtained ureas and urethanes substituted at the nitrogen atom by halogen alkyl radicals.

The compounds obtainable by the process above described of the general formula:

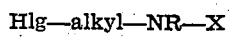

wherein Hlg stands for halogen, R means hydrogen or an organic radical and X stands for an aliphatic, cycloaliphatic, araliphatic or aromatic acid radical, may be used as intermediate products for the manufacture of dyestuffs, textile adjuvants and pharmaceutical products.

The following examples serve to illustrate the invention but they are not intended to limit it thereto, the parts being by weight unless otherwise stated:

(1) 22 parts of ethylene-imine are slowly added from a dropping funnel to a solution of 52 parts of benzoyl chloride in 300 parts of chloroform while vigorously stirring and thoroughly cooling. The temperature is kept below 0° C. The N-($\beta$-chlorethyl)-benzamide formed separates in the form of snow-white crystals. It is stirred in the liquid for some further hours, filtered with suction and washed with carbon tetrachloride. It is thus obtained in pure condition and melts at 103° C.

(2) A solution of 30 parts of ethylene-imine in 100 parts of acetone is slowly run into a solution of 150 parts of stearic acid chloride in 300 parts of acetone while vigorously stirring. By cooling, the temperature is kept between 10° C. and 20° C. The N-($\beta$-chlorethyl)-stearic acid amide formed crystallizes at once. It is stirred in the liquid for ¼ hour at room temperature, filtered with suction, washed with acetone and dried at 60° C. to 65° C. It is thus obtained with a good yield; it melts at 77° C.

(3) 61 parts of $\beta$-anthraquinonesulphochloride are suspended in 300 parts of alcohol. While vigorously stirring at room temperature 12.9 parts of ethylene-imine, dissolved in 50 parts of alcohol, are slowly dropped in. By cooling, care is taken that the temperature does not rise above room temperature. The mixture is stirred for 1 hour, then filtered with suction and washed with alcohol. The nearly colorless N-($\beta$-chlorethyl)-$\beta$-anthraquinonesulphamide obtained is sparingly soluble in alcohol and acetone and easily soluble in chloroform. After recrystallization from glacial acetic acid it melts at 173° C.

(4) A solution of 43 parts of ethylene-imine in 200 parts of acetone is run into a solution of 108 parts of chlorocarbonic acid ethyl ester and 500 parts of acetone while vigorously stirring and thoroughly cooling. The temperature should not rise above —5° C. After the introduction of the ethylene-imine solution the acetone is evaporated and the residue is distilled under reduced pressure. The N-($\beta$-chlorethyl)-carbamic acid ethyl ester formed distils under a pressure of 22 mm. mercury between 115° C. and 120° C. in a nearly quantitative yield.

(5) 25 parts of ethylene-imine are added drop by drop to a solution of 100 parts of para-nitrophenyl-carbamic acid chloride in 300 parts of acetone while vigorously stirring and thoroughly cooling. The temperature should not rise above 0° C. It is stirred for 1 hour, filtered with suction and washed with ice-cold acetone. Yellow impurities which may be present may be removed by extraction with ethyl acetate. After recrystallization from ethyl acetate the N-(para-nitrophenyl)-N'-(β-chlorethyl)-urea formed is obtained in the form of nearly colorless crystals melting at 136° C.

(6) 300 parts of phosgene are introduced at 0° C. into 900 parts of acetone. The mixture is then cooled to −10° C. and, while vigorously stirring, a solution of 300 parts of ethylene imine in 600 parts of acetone is slowly added, drop by drop. The temperature is raised at the end of the introduction of the solution to 30° C. After stirring has been continued for 2 hours at 30° C. the same quantity of water is added and after having been allowed to stand for several hours, the solution is filtered with suction. The N.N'-di(β-chlorethyl) urea formed is obtained in a good yield in the form of a snow-white crystalline mass. By recrystallization from alcohol, crystals are obtained melting at 127° C.

(7) 88 parts of benzene sulfonic acid chloride are dissolved in 300 parts of acetone. Into this solution there is slowly run, while thoroughly cooling and vigorously stirring, a solution of 25 parts of ethylene imine in 50 parts of acetone. The temperature must not exceed 0° C. After the solution of ethylene imine has run in the temperature is slowly raised to room temperature and the solution is further stirred for some hours. After the acetone has been distilled the benzene sulfonic acid-β-chlorethyl amide is distilled in the vacuum. Under a pressure of 8 mm. mercury it distils between 226° C. and 230° C. as a nearly colorless oil, which crystallizes on cooling. The compound is sparingly soluble in water and readily soluble in nearly all organic solvents. By recrystallization from a mixture of alcohol and water, colorless rod-shaped crystals are obtained melting at 70° C.

(8) A solution of 100 parts of ethylene-imine in 160 parts of methanol is slowly run into a solution of 229 parts of methane sulfochloride in 800 parts of methanol while stirring and thoroughly cooling. The temperature is kept below 0° C. After the solution of ethylene imine has run in the temperature is slowly raised to room temperature and the whole is further stirred for a short time. The methanol is then evaporated and the residue is distilled in vacuum. The methane sulfonic acid-β-chlorethyl amide formed distils under a pressure of 3-4 mm. of mercury between 145° C. and 150° C. in a satisfactory yield as a feebly yellow oil which does not crystallize. The compound is readily soluble in water and very readily soluble in the usual organic solvents.

(9) A solution of 30 parts of ethylene-imine in 50 parts of acetone is slowly run into a solution of 100 parts of propane sulfonic acid chloride in 400 parts of acetone at a temperature below 0° C., while vigorously stirring. The temperature is then gradually raised to room temperature and the solution is further stirred for some hours. After the acetone has been distilled the residue is subjected to a distillation in vacuum. The propane sulfonic acid-β-chlorethyl amide formed distils under a pressure of 5 mm. of mercury between 165° C. and 170° C. as a brownish oil. On a second distillation the compound distils at a pressure of 0.2 mm. of mercury constantly at 145° C. as a feebly yellow oil which crystallizes in the cold. The compound is sparingly soluble in water and readily soluble in nearly all organic solvents and in dilute alkalies.

(10) A solution of 43 parts of ethylene-imine in 80 parts of acetone is slowly added to a solution of 113 parts of chloro acetyl chloride in 400 parts of acetone at a temperature below 0° C., while vigorously stirring. The temperature is then slowly raised to room temperature, the solution is further stirred for some time, the acetone is evaporated and the residue is subjected to a distillation in vacuum. The chloro acetic acid-β-chlorethyl amide formed distils at a pressure of 4 mm. of mercury between 105° C. and 120° C. as a brown oil which crystallizes on cooling. For a further purification it is treated with 500 parts of water in a ball mill, filtered with suction, washed with ice-water and dried in vacuum above calcium chloride. It forms snow-white crystals which are readily soluble in nearly all organic solvents and in water and melt at 56° C.

(11) A solution of 43 parts of ethylene-imine in 80 parts of acetone is run into a solution of 64 parts of oxalyl chloride in 400 parts of acetone at a temperature below 0° C., while vigorously stirring. The temperature is then slowly raised to room temperature and the whole is further stirred for 1 hour. The oxalic acid-di-(β-chlorethyl amide) precipitated is filtered with suction, washed with acetone and dried. The compound is obtained as a white powder which is sparingly soluble in water and in most of the usual organic solvents. From hot glacial acetic acid the compound crystallizes in brilliant colorless crystals melting at 200° C.

(12) A solution of 50 parts of ethylene-imine in 200 parts of acetone is run into a solution of 91 parts of adipic acid chloride in 300 parts of acetone, while thoroughly cooling and vigorously stirring. The temperature is kept below 0° C. After the solution has been dropped in, the whole is further stirred for 2 hours without cooling. The adipic acid-di-(β-chlorethyl amide) precipitated as a colorless compound is filtered with suction, washed with acetone and dried. The yield amounts to 115 parts of a very pure substance. The compound is sparingly soluble in water, acetone, ethylacetate, benzene and most of the other usual organic solvents and soluble in alcohol, glacial acetic acid and dioxane wherefrom it may be recrystallized. By recrystallization from alcohol brilliant flakes are obtained melting at 151° C.

(13) 119.5 parts of sebacic acid chloride are dissolved in 300 parts of ice-cooled acetone. Into this solution there is slowly run at a temperature below 0° C. a solution of 50 parts of ethylene imine in 200 parts of acetone. It is then further stirred for 2 hours without cooling.

After the addition of a small quantity of water the sebacic acid-di-(β-chlorethyl amide) precipitated as a colorless crystalline magma is filtered with suction, washed with acetone and dried at 70° C. The yield amounts to 130 parts. The compound is sparingly soluble in water and in most of the usual organic solvents; it is soluble in alcohol, glacial acetic acid and dioxane, wherefrom it may be recrystallized. By recrystallization from alcohol and a small quantity of water colorless crystals are obtained melting at 147° C.

I claim:

1. The process of preparing acylated halogen alkylamines which comprises adding a monomeric α,β-alkylene-imine in at most equimolecular proportion to a halide selected from the group consisting of saturated aliphatic and carbocyclic carboxylic acid halides and sulfonic acid halides in the absence of an agent having an alkaline action.

2. The process of preparing acylated halogen alkylamines which comprises adding a monomeric ethylene imine in at most equimolecular proportion to a halide selected from the group consisting of saturated aliphatic and carbocyclic carboxylic acid halides and sulfonic acid halides in the absence of an agent having an alkaline action.

3. The process of preparing methane sulfonic acid-β-chlorethyl amide which comprises adding ethylene imine in at most equimolecular proportion to methane sulfochloride in the absence of an agent having an alkaline action.

4. The process of preparing adipic acid di-(β-chlorethyl amide) which comprises adding ethylene imine in at most equimolecular proportion to adipic acid chloride in the absence of an agent having an alkaline action.

5. The process of preparing stearic acid-β-chlorethyl amide which comprises adding ethylene imine in at most equimolecular proportion to stearic acid chloride in the absence of an agent having an alkaline action.

HERBERT BESTIAN.